(12) United States Patent
Diehl et al.

(10) Patent No.: US 6,808,445 B2
(45) Date of Patent: Oct. 26, 2004

(54) DEVICE FOR LOADING AND UNLOADING OPTICAL WORKPIECES

(75) Inventors: Joachim Diehl, Giessen (DE); Herbert Groh, Wetzlar-Garbenheim (DE); Bernd Becker, Holzhausen (DE)

(73) Assignee: LOH Optikmaschinen AG (DE)

( * ) Notice: Subject to any disclaimer, the term of this patent is extended or adjusted under 35 U.S.C. 154(b) by 70 days.

(21) Appl. No.: 10/312,247

(22) PCT Filed: Jun. 26, 2001

(86) PCT No.: PCT/EP01/07283

§ 371 (c)(1),
(2), (4) Date: Dec. 23, 2002

(87) PCT Pub. No.: WO02/00392

PCT Pub. Date: Jan. 3, 2002

(65) Prior Publication Data

US 2004/0033768 A1 Feb. 19, 2004

(30) Foreign Application Priority Data

Jun. 26, 2000 (DE) .......................... 100 29 966

(51) Int. Cl.⁷ .............................................. B24B 47/02
(52) U.S. Cl. ........................ 451/333; 451/42; 451/255; 451/339
(58) Field of Search .................. 451/42, 255, 256, 451/277, 325, 331, 333, 336, 339

(56) References Cited

U.S. PATENT DOCUMENTS

| | | | |
|---|---|---|---|
| 3,140,567 A | | 7/1964 | Soong et al. ................. 51/108 |
| 4,084,459 A | | 4/1978 | Clark |
| 4,316,398 A | * | 2/1982 | Link et al. ..................... 82/125 |
| 4,458,566 A | * | 7/1984 | Tajima ........................ 82/124 |
| 4,646,422 A | * | 3/1987 | McMurtry ..................... 483/1 |
| 4,787,280 A | * | 11/1988 | Voelkerding ................. 82/124 |
| 5,782,151 A | * | 7/1998 | Shiramasa ................... 82/124 |
| 5,901,624 A | | 5/1999 | Shiramasa ................... 82/124 |
| 6,510,769 B1 | * | 1/2003 | Kalinsky ....................... 82/47 |

FOREIGN PATENT DOCUMENTS

| | | |
|---|---|---|
| DE | 39 04374 A1 | 8/1989 |
| DE | 198 30 365 C1 | 1/2000 |

* cited by examiner

Primary Examiner—Timothy V. Eley
(74) Attorney, Agent, or Firm—McAndrews, Held & Malloy, Ltd.

(57) ABSTRACT

The invention relates to a device for loading and unloading optical workpieces, for an optical machine. The device comprises a loading arm (24) which is pivotally driven about an axis (A) and is pivoted in controlled movement sequences on the optical machine between a workpiece magazine (26, 28) and the operating position. The outer end of the loading arm is provided with a device (30) for receiving and placing workpieces. According to the invention, the swivelling axis of the loading arm is the central axis of a spindle (40) which rotates in both directions of rotation ($D^+$, $X^-$) and which can be driven linearly in a lifting motion in both axial directions ($X^+$, $X^-$) by means of drive elements, as well as guided in guide elements in a rotating and displacing manner. The loading arm (24) is fixed to the spindle.

11 Claims, 3 Drawing Sheets

DEVICE FOR LOADING AND UNLOADING OPTICAL WORKPIECES

This application is a 371 of PCT/EP01/07283 filed Jun. 26, 2001.

TECHNICAL AREA

The present invention relates, according to the preamble of claim 1, to a device for loading and unloading of optical workpieces, in particular optical lenses, for a lens machine with a loading arms driven swivellable about an axis which in controlled movement processes swivels between a workpiece magazine and the processing station on the lens machine and at its outer end is fitted with a device for picking up and depositing workpieces. Although the description below discusses only the loading or unloading of workpieces, the device is however equally suitable for tool changing.

STATE OF THE ART

Automatic loading systems for lens machines are becoming increasingly important because of rising personnel costs. Such loading systems have to take into account a wide range of workpieces, high accuracy requirements and small batch sizes. According to the state of the art there are three different construction concepts, namely (1) devices with cam-controlled loading arms, (2) devices with pneumatic loading arms driven by cylinders and swivel rotors and (3) devices which for loading or unloading use the CNC axes present on the lens machines.

(1) Cam-controlled loading arms have been in use for decades (e.g. DE-PS 12 38 802). Such cam-controlled loading systems require great expense in set up and adjustment, offer no facility for influencing the speed of the movement—which is very important with different workpiece weights—and can only approach established, unchanging loading and unloading positions.

(2) Pneumatic loading arms driven by cylinders and swivel rotors with automatic stops and dampers are used today in various lens machines. Known automation systems for lens machines (e.g. EP 0 090 752 A1, EP 0 175 431 B1, U.S. Pat. No. 2,933,863) work using pneumatic drive elements with complex devices requiring costly maintenance. Because of the compressibility of compressed air and the stick-slip effect occurring on the pneumatic cylinders, these systems have disadvantages. In these systems the force with which the loading system is set in movement can be restricted relatively simply by restricting the pressure of compressed air, but difficulties occur with an external movement restriction of the loading arm. When this restriction is not present, namely very rapid swivel or linear movements result which lead either to the workpieces being flung off or at least displaced and hence to a change in workpiece position. Furthermore in pneumatically operated loading systems the stops shift due to wear and/or vibration. The movement speed is affected by external influences e.g. the lubrication state of the mechanics and the compressed air, the soiling of the mechanical elements involved or the amount of pressure in the compressed air. This is particularly critical when loading large delicate workpieces. To summarise it can be found that the precision and reliability of the workpiece insertion using such loading systems are relatively low. In addition, such systems can also approach only a few established positions of the loading arm.

(3) Recently more attempts have been made to achieve the supply to lens machines using the existing CNC axes of the lens machine (e.g. DE 198 25 922 A1). The carriages of the horizontal movement axes are moved over long distances, where a piston-cylinder arrangement mounted on one of the carriages collects the workpieces with a suction device from a magazine arranged outside the processing area of the lens machine. This design is indeed flexible and works relatively precisely in position, but large masses must be moved over long distances, leading to relatively long change times. Also the CNC axis can only be used for the feed process when the actual machining processes on the lens machine have previously been completed. A prepositioning of the optical lens to be machined close to the chuck of the workpiece spindle during machining of another lens is not possible. In addition the longer linear axes necessary cause a considerable increase in production costs of such lens machines and also lead to larger and hence heavier machines.

Finally, as the state of the art which does not concern lens machines directly, reference is made to the publications DE 40 37 773 A1 and DE 198 30 365 C1.

DE 198 30 365 C1 discloses a rotary stroke drive with a stroke drive unit coupled to a rotary drive unit. Here the stroke drive unit has a gear motor arranged in a stroke drive housing for stroke drive of a threaded spindle, and the rotary drive unit has a gear motor arranged in a rotary drive housing for rotary drive of an output shaft, which are arranged coaxial to each other and connected together via a coupling unit to transfer the stroke to the output shaft. The output shaft itself can be connected with a robot arm which carries a sucker for collection and deposit of e.g. workpieces.

DE 40 37 773 A1 discloses a swivel arm robot with a rotary stroke unit which has a spindle sleeve and arranged thereon a gripper holder which is rotatable about a rotary axis and longitudinally mobile in the vertical direction. The construction elements which achieve the translatory and rotatory movement of the spindle sleeve are not described in detail in this state of the art.

The present invention is therefore based on the task of producing a device for loading and unloading of optical workpieces, in particular optical lenses, which avoids the said disadvantages of the former systems and allows a compact and simple structure with a high loading and unloading precision.

DESCRIPTION OF THE INVENTION

According to the invention in a device for loading and unloading optical workpieces for a lens machine with a loading arm driven swivellable about an axis, which arm can swivel in controlled movement processes between a workpiece magazine and the machining station on the lens machine and at its outer end has a device for picking up and depositing workpieces, the swivel axis of the loading arm is the centre axis of a spindle rotating in both directions of rotation and drivable mobile in linear strokes in both axial directions by drive elements and guided rotatably and displaceably in guide elements, on which spindle is attached the loading arm, where the spindle is designed both as a splined shaft and as a threaded spindle and is guided by two rotatably mounted, fixed location nut elements forming the guide elements, of which one nut element engages with the splined shaft and the other nut element with the threaded spindle, where the nut elements can be driven individually or simultaneously, in opposite or the same direction of rotation.

Thus an essential feature of the invention is the use of a special spindle equipped with several overlaying degrees of movement freedom, the movement processes of which can be freely programmed, preferably independently of the control of the machining processes being performed on the lens machine. This spindle guides and controls in a compact, simple and stable manner all movements of the loading arm i.e. both its stroke and its rotation movements, without end-of-travel stops being required. In this way the loading arm can approach any intermediate positions at which the device can be fitted with equipment for additional work processes such as precentring, turning or rotating, measuring or washing of the lens. As the loading arm in each direction can be guided over any long or short swivel or stroke movements, all movement processes can be performed with optimum travel and hence time. A spindle which can be used for the purposes of the invention is available commercially under the name "Ball Screw Spline" type BNS from the company THK Co. Limited, Tokyo, Japan. Finally in this connection it should also be stated that the device provided on the loading arm for picking up and depositing workpieces can for example be a vacuum-operated suction element adjustable in height to pick up lenses of different thicknesses against spring force, or a gripper or clamping element driven by compressed air.

In an advantageous embodiment of the invention, the spindle with the loading arm, its drive elements and guide elements is attached to a frame which as a self-contained system carrier can dock on the lens machine in a defined position to the workpiece spindle of the lens machine so that the workpiece spindle of the lens machine lies on a swivel circle of the loading arm device. Thus the device can be used as a loading system on any lens machine e.g. fine grinding, polishing, centring or lens edge machining apparatus, even by subsequent fitting. The frame of the invention is there preferably docked on the front side of the lens machine concerned and as a self-contained system carrier can carry or contain all mechanical elements such as also the electronic controls, the operating and display elements (keyboard/screen) and the pneumatics for the device provided on the loading arm for picking up and depositing workpieces. The frame of the device can in a compact construction also have a cylindrical metal sleeve which holds the nut elements according to the invention and protects these against soiling.

In a further development of the inventive concept, the frame can dock on the lens machine at its lower end via swivel pins and at its upper end via screws and stops which can be adjusted to achieve in a simple manner the axial parallelity between the spindle and the workpiece spindle of the lens machine. As a result after release of the screws the device can be swivelled away to the front whereby e.g. the workpiece spindle of the lens machine is easily accessible for maintenance or repair purposes without hindrance from the device. Alternatively or in addition the frame can also be attached swivelling to the side on the lens machine. Here also adjustable stops and screws can be provided which serve to set the rotary axis distance from the spindle and workpiece spindle.

In a suitable embodiment of the device the first of the two nut elements is attached to the frame at the top by means of the associated support bearing whereas the second nut element is attached to the frame at the bottom by means of the associated support bearing axially aligned with the first nut element, where to each nut element is allocated a drive motor attached to the frame, preferably a stepper motor, which via a toothed belt is in drive connection with a pulley coaxially attached to the associated nut element.

In the further development of the invention at the lower end of the totally hollow spindle can be applied a rotary passage through which a vacuum can be applied and/or compressed air supplied to the device of the loading arm. By using the spindle itself as a supply or guide element, the pneumatic pressure can easily be applied to the loading arm device.

In an advantageous refinement of the invention, on the frame of the device are preferably fitted two magazines for blanks and finished workpieces, the collection and deposit positions of which are on the swivel circle of the loading arm device. The workpieces to be processed or already processed are stored in these magazines so that they can be guided into the relevant collection position or from the deposit position. Preferably the two magazines are rotatable or where applicable exchangeable plate magazines which are symmetrically arranged at the side and—viewed from the front—in front of the spindle, and the rotary axes of which are aligned parallel to the spindle and allocated to each of which is a freely programmable and indexable drive attached to the frame. Thus advantageously there is a good adaptation facility to different workpiece sizes and geometries. As an alternative to the magazine, according to the relevant requirements, a conveyor belt for recipe or lens transport cases can be arranged in relation to the swivel circle of the loading arm device such that by means of the loading arm device, blanks and finished workpieces can be collected from or deposited in correspondingly positioned boxes by means of the conveyor belt.

According to the requirements also between the two above-mentioned magazines on the frame can be arranged a centring station for the workpieces with its centre on the swivel circle of the loading arm device. Using such known centring stations, workpieces with tolerances can be precentred after collection from the blank magazine in order to allow precise insertion of the workpiece in the chuck of the workpiece spindle.

The device can also have a workpiece turning device fitted to the frame on the swivel circle of the loading arm device. With this it is possible to use the device also to feed a lens machine for bilateral surface machining on the workpiece.

Finally in a further refinement of the inventive concept, the loading arm can be formed as a V-shaped double arm with at each arm end devices to pick up and deposit workpieces, which devices lie in the same swivel circle and can be connected independently with a vacuum and/or compressed air source. This measure achieves a particularly rapid workpiece change for example by the device on one arm end transporting a blank workpiece and the device on the other arm end transporting a finished workpiece. In this case through the preferably hollow spindle are guided two separate pneumatic lines in order to supply energy to the two devices at the arm ends at different times. To this end in the spindle can be inserted a tube, where applicable concentric to the spindle, where the interior of the tube and the annular space between the outer peripheral surface of the tube and the inner wall of the spindle can be supplied with vacuum and/or compressed air separately from each other via the rotary passage.

BRIEF DESCRIPTION OF THE DRAWINGS

The invention is now described below in more detail using a preferred embodiment example with reference to the enclosed diagrammatic drawing. This shows.

DETAILED DESCRIPTION OF AN EMBODIMENT EXAMPLE

Figure 1:
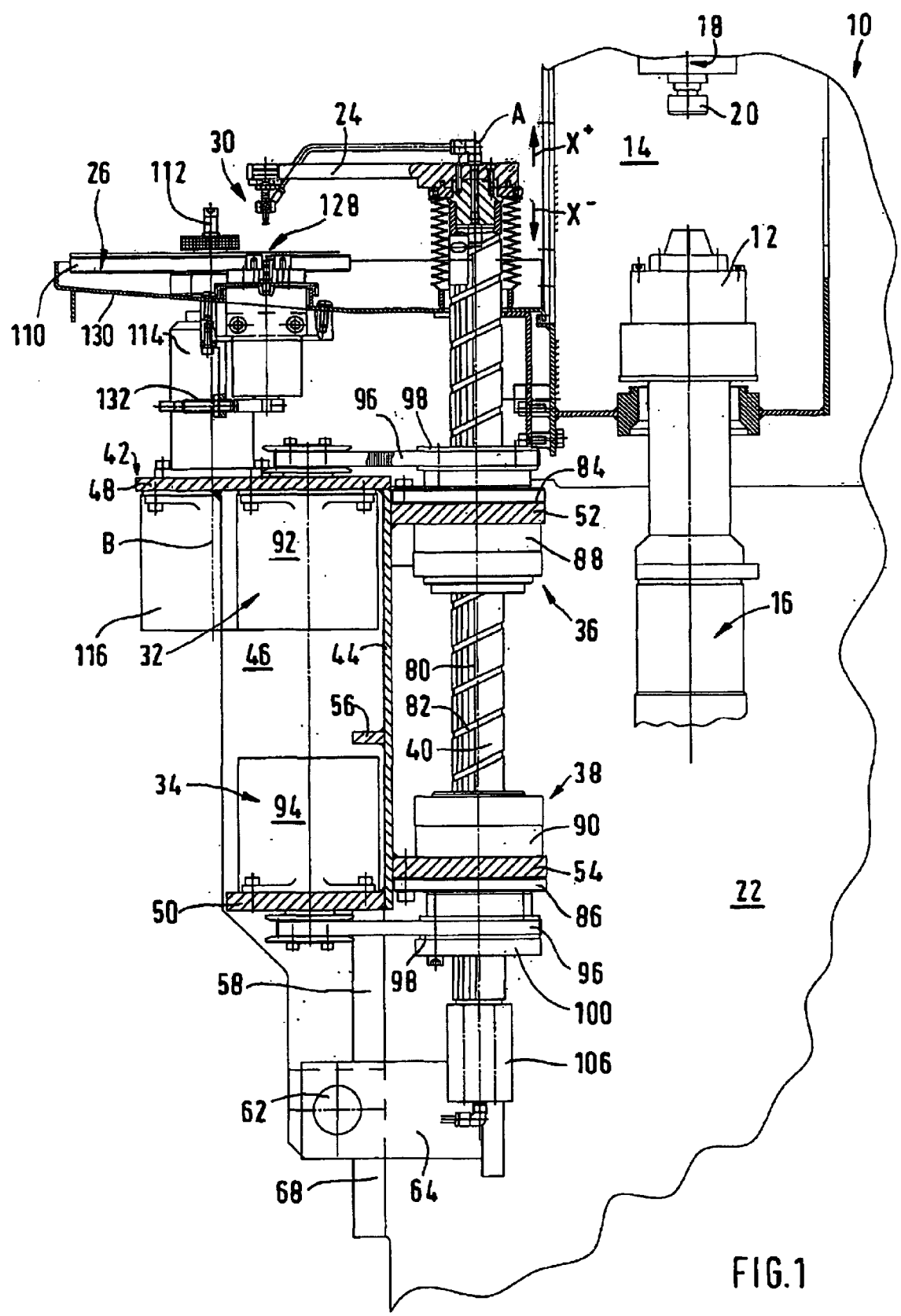
FIG. 1 a vertical section view of a device according to the invention along cutting line I—I in FIG. 2, which is docked at a lens machine of which only a broken-away part area is shown, FIG. 2 a partly broken away front view of the device in FIG. 1, where the loading arm of the device at its end carries a device for picking up and depositing workpieces which is designed differently from that in FIG. 1, and FIG. 3 a broken away top view of the device according to FIG. 1, where above the magazine is also provided a crosspiece which supports adjustable arms for orientation of the bulk goods in the left-hand magazine.

The figures show the use of a device for loading and unloading optical workpieces on the front of a lens machine 10, in the embodiment example shown a grinding machine for single optical lenses. The lens machine 10 according to FIGS. 1 and 3 has a vertical workpiece spindle 16 projecting with a workpiece holder or clamping jaw 12 into a machining area 14 of the lens machine 10. The workpiece spindle 16, like a tool spindle 18 which is opposite the workpiece spindle 16 in machine area 14 and carries a pot tool 20 in the embodiment example shown, is mounted in a manner not shown in the figures in a machine frame 22 of the lens machine 10.

Figure 2:
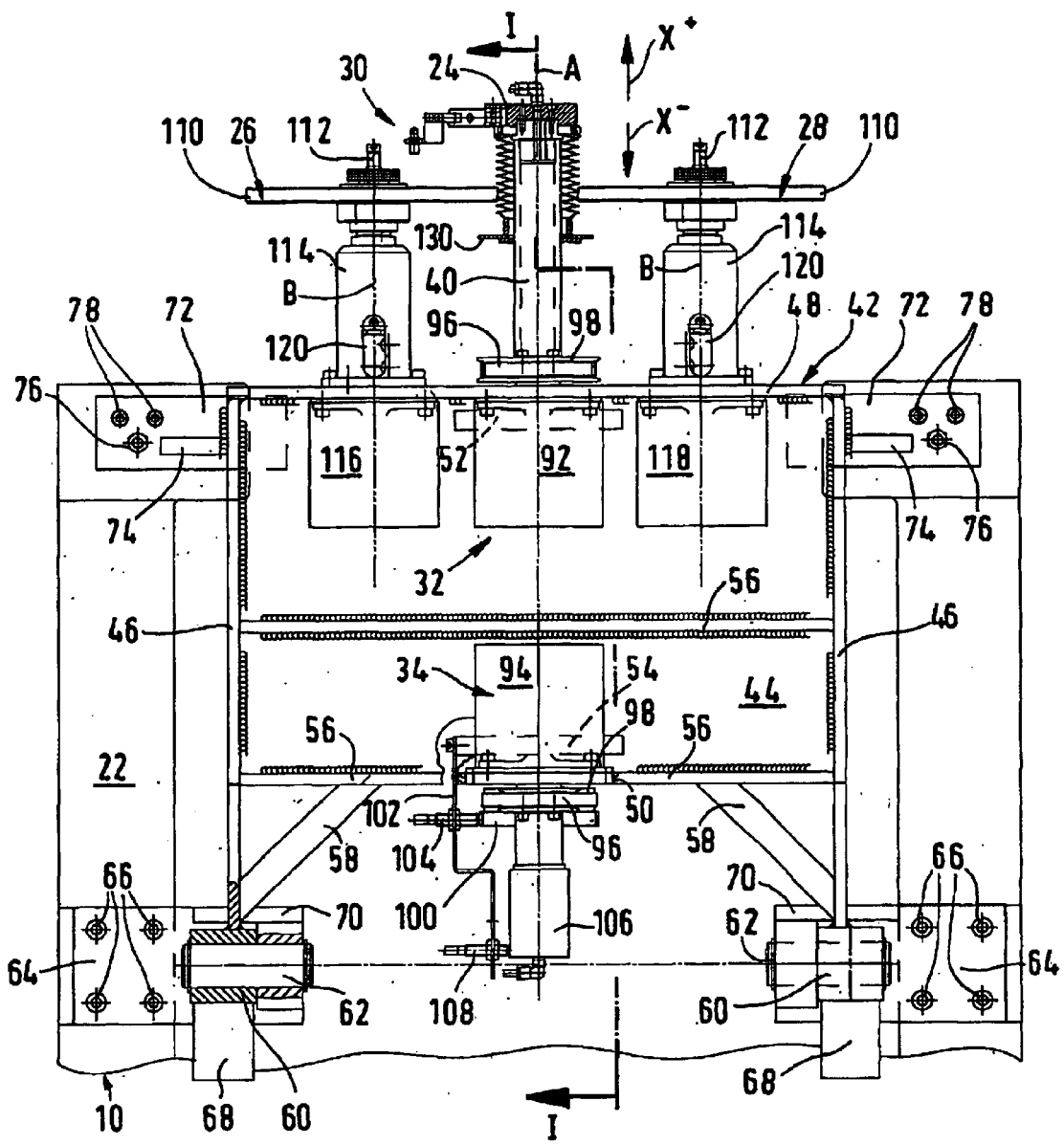

In a manner to be described, the device for loading and unloading optical workpieces docks on the machine frame 22 and has a loading arm 24 driven swivellable about an axis A. The loading arm 24 can swivel in controlled movement processes between a—or in the embodiment example shown two—workpiece magazine(s) 26, 28 and the machining position on the lens machine 10, i.e. a position in the machining area 14 between the workpiece spindle 16 and the tool spindle 18. On the outer end of the loading arm 24 is provided a device 30 for picking up and depositing workpieces which—as shown in FIG. 1—can have a vacuum-operated sucker element or—as shown in FIG. 2—a compressed air-operated gripper or clamping element. These elements are known in principle and are not therefore described in detail. It is essential that the swivel axis A of the loading arm 24 is the centre axis of a spindle 40 rotating in both directions of rotation $D^+$ and $D^-$ (see FIG. 3) and driven mobile in linear strokes in both axial directions $X^+$ or $X^-$) (see FIGS. 1 and 2) by drive elements 32 and 34, and guided rotatably and displaceably in guide elements 36, 38, at the upper end of which spindle is attached the loading arm 24 as will be explained below.

As can be clearly seen from FIGS. 1 and 2, the modular device shown here has a frame 42 constructed as a welded construction on which is fitted the spindle 40 with loading arm 24, its drive elements 32 and 34 and its guide elements 36 and 38. The frame 42 can as a self-contained system carrier be docked on any lens machine 10 in a defined position to the workpiece spindle 16 of the lens machine 10 so that the centre axis of the workpiece spindle 16 of the lens machine 10 lies on the swivel circle K of the device 30 of the loading arm 24.

According to FIGS. 1 and 2, the frame 42—designed extremely stable—has a vertically running wall 44 which extends over the entire width of the frame 42 and in FIG. 2 is welded to a side cheek 46 on both sides. The wall 44 at its upper end in FIGS. 1 and 2 is welded to a flange section 48 extending horizontally forwards from the wall 44 over the entire width of the frame 42 for—inter alia—the upper drive element 32 of the spindle 40, whereas at the lower end the wall 44 is welded to a flange section 50, also extending horizontally forwards but narrower, for the lower drive element 34 of the spindle 40. On the back of the wall 44, close to the upper and lower ends of the wall 44, are horizontally extending flange sections 52 and 54, shown in dotted lines in FIG. 2, for the upper and lower guide elements 36, 38 of the spindle 40. The wall 44 is finally reinforced with reinforcing ribs 56.

The narrower lower end of the side cheeks 46 reinforced with reinforcement elements 58 running diagonally in FIG. 2 opposite the lower reinforcement ribs 56 on the wall 44, are fitted with the sleeve sections 60 to form swivel bearings at the lower end of the frame 42, through which sections protrude swivel pins 62. The swivel pins 62 are mounted rotatably on bearing blocks 64 which are connected firmly to the machine frame 22 of the lens machine 10 by means of bolts 66. Finally on the sleeve sections 60 are attached stops 68 which co-operate with the strips 70 mounted on the bearing blocks 64 to prevent further swivelling—anticlockwise in FIG. 1—of the frame 42 about the swivel pins 62 when the frame 42 for maintenance purposes or similar is swivelled on the workpiece spindle 16 in an essentially horizontal position.

As shown in FIG. 2 at the upper end of the frame 42 on both sides are provided tab sections 72 which are attached to the respective side cheeks 46 and supported in relation to this each with one reinforcement element 74. To achieve the axial parallelity shown in FIG. 1 between the spindle 40 and the workpiece spindle 16 of the lens machine 10, adjustable stops are present in the form of setscrews 76 screwed into allocated threaded bores in the tab sections 72. To fix the position of the frame 42 after adjustment of the setscrews 76, the tab sections 72 are screwed to the machine frame 22 of the lens machine 10 by means of screws 78. It is clear that for maintenance purposes on the lens machine 10, after releasing the screws 78, the frame 42 can be swivelled about the swivel pin 62 forwards or anticlockwise in FIG. 1 away from the machine frame 22 until as already stated the stops 68 of the frame 42 come to rest on the strips 70 of the bearing block 64.

As is clearly evident from FIG. 1, the spindle 40 over its stroke length is formed throughout as a splined shaft (keyway 80) and as a threaded spindle (thread 82) and passed through two fixed location different nut elements 88 and 90 mounted with mutual vertical spacing via support bearings 84, 86 which form the guide elements 36 and 38 and are rotatably mounted on their support bearings 84 and 86. Here one of the nut elements 88, 90 engages with the splined shaft (keyway 80) whereas the other of the nut elements 88, 90 engages with the threaded spindle (thread 82), where the nut elements 88, 90 can be driven via separate drive elements 32, 34 individually or simultaneously, in opposite or the same directions of rotation. Depending on whether the nut elements 88, 90 are driven individually or simultaneously, in opposite or the same direction, an axial lifting ($X^+$) or lowering movement ($X^-$), a radial swivel movement clockwise ($D^+$) or anticlockwise ($D^-$), or an overlaid movement i.e. a spiral movement takes place of the loading arm 24 rigidly attached at the upper end of the spindle 40. This drive thus simultaneously offers the function of a circulating ball screw and a splined shaft guide.

According to FIGS. 1 and 2 the first 88 of the two nut elements 88, 90 is attached by means of the associated support bearing 84 at the top of frame 42 namely on flange section 52, whereas the second nut element 90 is attached by means of the associated support bearing 86 axially aligned with the first nut element 88 at the bottom of frame 42 namely on flange section 54. Allocated to each nut element 88, 90 is a drive motor 92, 94 attached to the frame 42—or more precisely to flange sections 48 or 50 of frame 42—which motor forms the relevant drive element 32, 34 and is preferably a stepper motor. The relevant drive motor 92, 94, via a toothed belt 96, is in drive connection with a pulley 98 coaxially attached to the associated nut element 88 or 90. In the context it should be stated that below the pulley 98 in FIGS. 1 and 2 is attached a cam disc 100 to which is allocated an inductive sensor 104 mounted on the flange section 54 of frame 42 by means of a retaining plate 102 and which serves to control the device for determining a reference value for the angular position of the spindle 40.

At the lower end of the fully hollow spindle 40 is attached a rotary guide 106 through which—depending on design of the device 30 provided on the loading arm 24 for picking up and depositing workpieces—a vacuum can be applied to the device 30 and/or compressed air can be supplied to this device 30. Opposite the rotary passage 106 is a further inductive scanner 108 mounted on the retaining plate 102 which serves to control the device to determine a reference value for the stroke position of the spindle 40.

Figure 3:
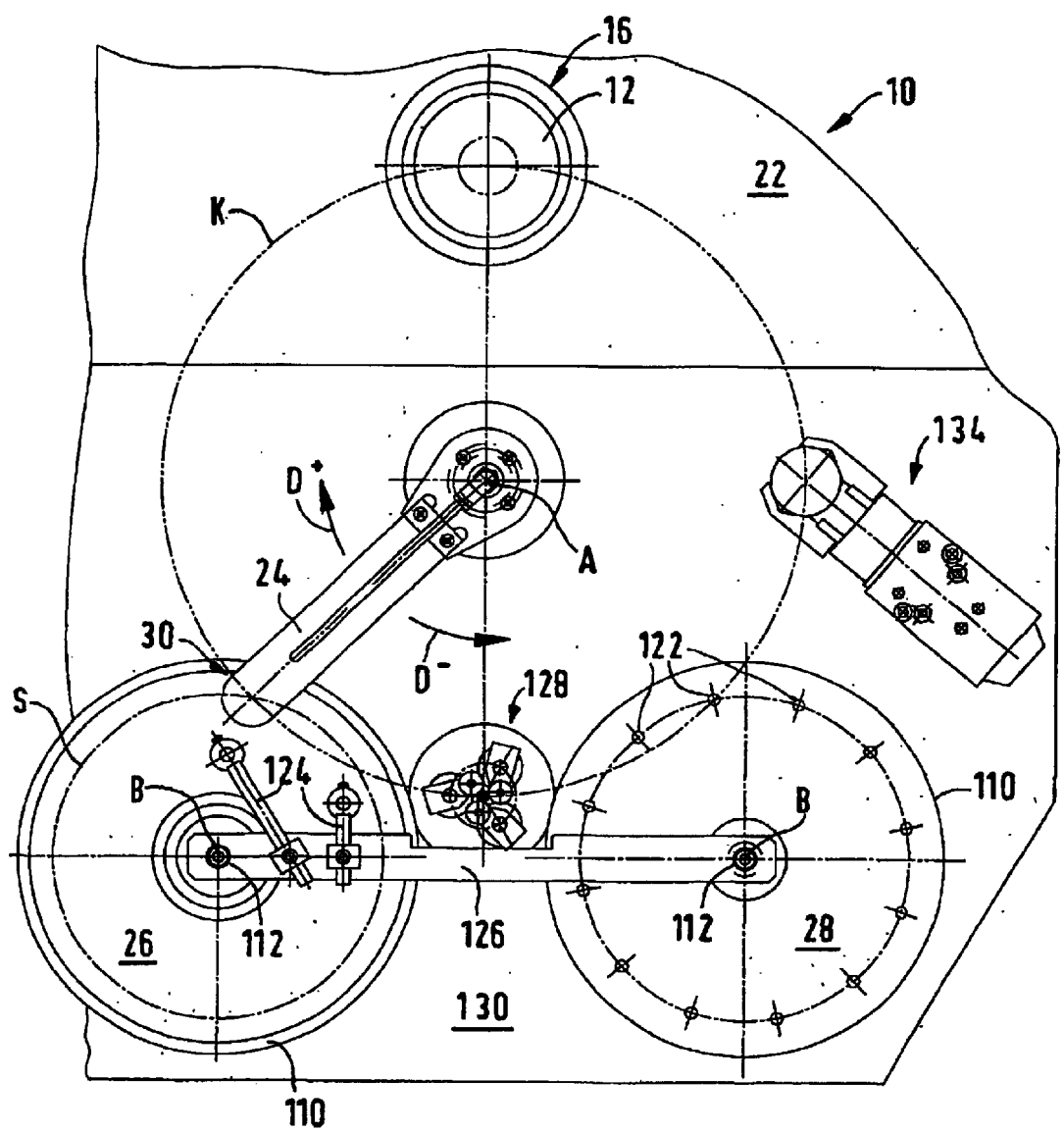

As can be seen in particular from FIG. 3, mounted on the frame 42 are arranged two magazines 26, 28 for blanks and finished workpieces, the collection and deposit positions of which lie on the swivel circle K of the device 30 of the loading arm 24. The two workpiece magazines 26, 28 are formed as rotary plate magazines, where applicable with exchangeable magazine plates 110 which each consist essentially of a thin laser-cut metal plate which can be produced economically to match the relevant workpiece diameter. Each magazine plate 110 is attached to a shaft 112 which is mounted rotatably in an allocated bearing housing 114 by means of bearings not shown, as is clear in particular in FIG. 2. The bearing housing 114 is itself flanged at the top to the flange section 48 of the frame 42 such that the workpiece magazines 26, 28 are symmetrically arranged at the side and—viewed from the front—in front of the spindle 40, whereas the rotary axes B of the workpiece magazines 26, 28 are aligned parallel to the spindle 40. Allocated to each workpiece magazine 26, 28 is a freely programmable and indexable drive 116, 118 attached to the underside of the flange section 48 of the frame 42, with which drive is actively connected the respective shaft 112 via a coupling not shown in more detail which is accessible via a recess 120 in the respective bearing housing 114.

FIG. 3 shows two different embodiments of the workpiece magazine 26, 28. Whereas on the right-hand workpiece magazine 28 intended to hold finished workpieces, a defined deposit position 122 is allocated to each finished workpiece, the left-hand workpiece magazine 26 provided to hold blanks is formed as a bulk goods magazine. Here are loaded small non-oriented lenses which, on rotation of the magazine plate 110, are guided by means of deflector or alignment arms 124 adjustably attached to a crosspiece 126 mounted on the shafts 112, on a collection circle S on the magazine plate 110 for prepositioning for collection by device 30 on the loading arm 24. It is evident to the expert that due to the flexibility of the spindle 40 i.e. its ability to approach with loading arm 24 any position on swivel circle K, other e.g. larger workpiece magazines can also be used.

FIGS. 1 and 3 finally show that according to the requirements in each case, between the two workpiece magazines 26, 28, a centring station 128, with its centre on the swivel circle K of the device 30 of the loading arm 24, for the workpieces can be arranged on the frame 42 or on a panel cover 130 firmly connected with frame 42. This can be a commercial, pneumatically driven three-finger gripper, the state of which (open or closed) can be monitored for control of the device by means of an inductive sensor 132 shown in FIG. 1. Furthermore according to FIG. 3, on frame 42 or on the panel cover 130 of frame 42 can be fitted a workpiece turning device 134 on swivel circle K of device 30 of the loading arm 24, which for bilateral surface machining allows the turning of the lens to be machined, i.e. its rotation through 180°. Such turning devices have been known for some time in the state of the art, so their structure need not be described here in detail.

The above device (preferably CNC-controlled in all movements) is programmed simply by means of a PLC with dialog menu, keyboard and display (not shown). With this various loading or unloading procedures, once programmed preferably by teach-in operation, can be stored and retrieved again at any time. In principle it is possible also to detect the lens height in teach-in mode with corresponding sensing, by detecting the torque occurring on the drive and learning the corresponding height position for the approximate lens collection. In total the device as described above with corresponding controls allows optimisation of all acceleration and braking ramps of the loading or unloading movements recorded over time in accordance with the respective workpiece weights and holding forces of the device on the loading arm, whereby both a much quicker loading process and a precise, reliable and repeatable loading or unloading can be guaranteed. Due to the possibility created by means of the frame, for using the device described on various lens machines even subsequently, there is a very high degree of flexibility also in relation to the workpiece size (for example lenses of less than 1 mm diameter to over 100 mm diameter can be loaded and unloaded without problem) and hence a very large area of application achieved for small batch sizes and also mass production.

A device is disclosed for loading and unloading optical workpieces, in particular optical lenses, for a lens machine. The device has a loading arm driven swivelling about an axis which can be swivelled in controlled movement processes between a workpiece magazine and the machining position on the lens machine and at its outer end is fitted with a device for picking up and depositing workpieces. According to the invention the swivel axis of the loading arm is the centre axis of the spindle rotating in both directions of rotation and driveable mobile in a linear stroke in both axial directions by drive elements and guided rotatably and displaceably in guide elements, on which spindle is attached the loading arm. The spindle is formed both as a splined shaft and as a threaded spindle and guided through two fixed location nut elements, rotatably mounted and forming the guide elements, of which one nut element engages with the splined shaft and the other nut element with a threaded spindle, where the nut elements can be driven via the drive elements individually or simultaneously, rotatable in opposite or the same directions. As a result a device is created which, while avoiding the disadvantages of former loading systems, has a compact and simple construction and works with high loading and unloading precision, reliably and quickly.

| REFERENCE LIST: | |
|---|---|
| 10 | Lens machine |
| 12 | Tool pick up |
| 14 | Machining area |
| 16 | Workpiece spindle |
| 18 | Tool spindle |
| 20 | Pot tool |
| 22 | Machine frame |

-continued

REFERENCE LIST:

| | |
|---|---|
| 24 | Loading arm |
| 26 | Workpiece magazine |
| 28 | Workpiece magazine |
| 30 | Device for picking up/depositing workpieces |
| 32 | Drive element |
| 34 | Drive element |
| 36 | Guide element |
| 38 | Guide element |
| 40 | Spindle |
| 42 | Frame |
| 44 | Wall |
| 46 | Side cheek |
| 48 | Flange section |
| 50 | Flange section |
| 52 | Flange section |
| 54 | Flange section |
| 56 | Reinforcement rib |
| 58 | Reinforcement element |
| 60 | Sleeve section |
| 62 | Swivel pin |
| 64 | Bearing block |
| 66 | Screw |
| 68 | Stop |
| 70 | Strip |
| 72 | Tab section |
| 74 | Reinforcement element |
| 76 | Setscrew |
| 78 | Screw |
| 80 | Keyway |
| 82 | Thread |
| 84 | Support bearing |
| 86 | Support bearing |
| 88 | Nut element |
| 90 | Nut element |
| 92 | Drive motor |
| 94 | Drive motor |
| 96 | Toothed belt |
| 98 | Pulley |
| 100 | Cam disc |
| 102 | Retaining plate |
| 104 | Inductive sensor |
| 106 | Rotary passage |
| 108 | Inductive sensor |
| 110 | Magazine plate |
| 112 | Shaft |
| 114 | Bearing housing |
| 116 | Drive |
| 118 | Drive |
| 120 | Recess |
| 122 | Deposit position |
| 124 | Alignment arm |
| 126 | Crosspiece |
| 128 | Centring station |
| 130 | Panel cover |
| 132 | Inductive sensor |
| 134 | Workpiece turning device |
| A = | Swivel axis |
| $D^+$ = | Direction of rotation |
| K = | Swivel circle |
| $X^+$ = | Axial direction |
| B = | Rotary axis |
| $D^-$ = | Direction of rotation |
| S = | Holding circle |
| $X^-$ = | Axial direction |

What is claimed is:

1. A device for loading and unloading optical workpieces on a lens machine of the type having a workpiece spindle, comprising:

a frame connectable to the lens machine;

a spindle mounted to the frame by guide elements for rotational movement in first and second directions of rotation and for linear movement in first and second axial directions;

drive elements carried by the frame and interconnected with the spindle through the guide elements such that the guide elements can be driven via the drive elements individually or simultaneously, rotating in the same or opposite directions; and a loading arm connected to the spindle for movement therewith;

wherein the frame defines a self-contained system carrier that can be connected with the lens machine in a defined and adjustable position in relation to the workpiece spindle of the lens machine.

2. A device for loading and unloading optical workpieces, in particular optical lenses, for a lens machine with a loading arm driven swivellable about an axis (A) which can be swiveled in controlled movement processes between a workpiece magazine and a machining position on the lens machine, the loading arm having an outer end fitted with a device for picking up and depositing workpieces, where the swivel axis (A) of the loading arm is the center axis of a spindle rotating in first and second directions of rotation ($D^+$, $D^-$) and driveable mobile in linear strokes in first and second axial directions ($X^+$, $X^-$) by drive elements and guided rotatably and displaceably in guide elements, on which spindle is attached the loading arm, for which the spindle is formed both as a splined shaft and as a threaded spindle and is guided through first and second rotatably mounted nut elements arranged at fixed locations and forming the guide elements, one of the first and second nut elements engaging with a splined shaft and the other of the first and second nut elements engaging with the threaded spindle, where the nut elements can be driven via the drive elements individually or simultaneously, rotating in the same or opposite directions, and where the spindle with its loading arm, drive elements and guide elements is mounted on a self-contained system carrier which can dock on the lens machine in a defined and adjustable position in relation to a workpiece spindle of the lens machine.

3. A device according to claim 2, wherein a frame forms the self-contained system carrier, said frame being constructed such that it can be docked on the lens machine so that the workpiece spindle of the lens machine lies on a swivel circle (K) of the device of the loading arm.

4. A device according to claim 3, wherein the self-contained system carrier can be docked onto the lens machine at its lower end via swivel pins and at its upper end via screws and stops which can be adjusted to achieve axial parallelity between the spindle and the workpiece spindle of the lens machine.

5. A device according to claim 3, wherein one of the first and second nut elements is attached by means of an associated support bearing to the top of the self-contained system carrier and the other of the first and second nut elements is attached by means of an associated support bearing to the bottom of the self-contained system carrier axially aligned with the first nut element, where to each nut element is allocated a drive motor, which is attached to the self-contained system carrier and via a toothed belt is in drive connection with a pulley attached coaxially to the associated nut element.

6. A device according to claim 3, further comprising two magazines for blanks and finished workpieces, the magazines being attached to the self-contained system carrier and including collection and deposit positions which lie on the swivel circle (K) of the device of the loading arm.

7. A device according to claim 6, wherein the two magazines are formed as rotatable and, wherein applicable, exchangeable plate magazines which are arranged symmetrically at the side and in front of the spindle, and wherein the axes of rotation (B) of the magazines are aligned parallel to the spindle and to each of which is allocated a freely programmable, indexable drive which is attached to the self-contained system carrier.

8. A device according to claim 6, further comprising a centering station for the workpieces, the centering station being located on the self-contained system carrier between the two magazines and having its center on the swivel circle (K) of the device of the loading arm.

9. A device according to claim 3, further comprising a workpiece turning device located on the self-contained system carrier, wherein the workpiece turning device lies on the swivel circle (K) of the device of the loading arm.

10. A device according to claim 2, wherein the spindle is a totally hollow spindle, and wherein the lower end of the spindle includes a rotary passage through which a vacuum can be applied and/or compressed air supplied to the device of the loading arm.

11. A device according to claim 2, where the loading arm is formed as a V-shaped double arm having first and second ends, the first and second ends being located on the same swivel circle, each end supporting an independently operable device for picking up and depositing workpieces.

* * * * *